United States Patent Office 3,492,193
Patented Jan. 27, 1970

3,492,193
SILICON-CONTAINING AMINO-PHOSPHONATES AND PROCESS OF MANUFACTURE
Giuliana C. Tesoro, Dobbs Ferry, N.Y., assignor to J. P. Stevens & Co., Inc., New York, N.Y., a corporation of Delaware
No Drawing. Filed Dec. 30, 1966, Ser. No. 606,049
Int. Cl. B32b 17/06; C03c 25/02
U.S. Cl. 161—93      31 Claims

ABSTRACT OF THE DISCLOSURE

Monomers and polymers of a silicon-containing amino-phosphonate characterized in that a silicon atom having one or more oxygen atoms bonded thereto is separated by an amino nitrogen from one or more carbon atoms having a respective phosphonate group bonded thereto and the amino nitrogen is linked to the silicon atom through a divalent organic radical. Also silicon containing imine compounds having one or more hydrolyzable groups attached to the silicon atom, and an imino nitrogen linked to the silicon atom through a divalent organic radical and linked to an unsubstituted or alkyl-substituted terminal carbon atom by a double bond.

Also, fibrous glass finished by silyl-amino-phosphonate as defined above, and laminates of thermosetting resin and glass fabric containing such compounds as coupling agents.

---

This invention relates to new organic compounds of phosphorus, characterized by the presence of both substituted silyl and amino groups in the same molecule, and to the use of such compounds for finishing glass and for improving the bonding of resins to glass. Specifically, this invention relates to the monomers, polymers and copolymers of silicon-containing amino-phosphonates. These novel compositions have utility, either by themselves or in combination with other silicon compounds, as finishes for fibrous glass and as coupling agents for laminates made of thermosetting resins and fibrous glass, particularly when the fibrous glass is woven and in the form of mutiple layers of glass fabric.

The invention also relates to methods of preparing such silyl-amino-phosphonates, and particularly, though not exclusively, from silicon-containing imine compounds wherein a silicon atom having one or more hydrolyzable groups thereon is linked to an imine nitrogen through an organic divalent radical, and the imino nitrogen is in turn linked to an unsubstituted or alkyl-substituted terminal carbon atom by a double bond.

*Monomers.*—In accordance with the present invention the monomers of the novel silicon-containing amino-phosphonate compounds have the following generic Formula I:

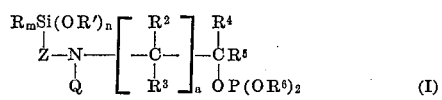

(I)

wherein $a$ has the value of zero or one;
$m$ has the value of zero, one, 2 or 3;
$n$ equals the quantity $(3m)$;
R and R' are each selected independently from the group consisting of alkyl, alkoxyalkyl, aralkyl and aryl;
$R^2$, $R^3$ and $R^4$ are each selected independently from the group consisting of H and alkyl;
$R^5$ is selected from the group consisting of H, alkenyl, alkyl, aralkyl and aryl;
$R^6$ is selected from the group consisting of lower alkyl and lower alkenyl;

Q is selected from the group consisting of H, alkyl, aryl and the grouping

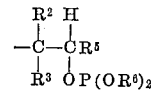

and

Z is a divalent organic radical selected from the group consisting of one or more unsubstituted or alkyl-substituted methylene groups and unsubstituted or alkyl-substituted methylene groups interrupted by groups selected from the class consisting of ether oxygen, thioether sulfur, secondary amino nitrogen, and tertiary amino nitrogen.

As indicated, compounds of this invention are phosphonates. Phosphonates are esters or salts of phosphonic acids. Phosphonic acids are organic acids having 2 acidic hydrogen atoms per phosphorus atom wherein the organic moiety is bonded directed to the phosphorus atom. Furthermore, one of the 3 oxygen atoms bonded to phosphorus is not linked to another atom. Phosphonates of the present invention are all diesters of lower alcohols.

Preparation of monomeric silicon-containing amino phosphonates

Silicon-containing amino-phosphonates which are characterized by having only one carbon atom between a secondary amino group and phosphorus are formed by an addition reaction involving an imine of the following general Formula II and a dialkyl phosphite (III), as indicated by Reaction A.

Reaction A

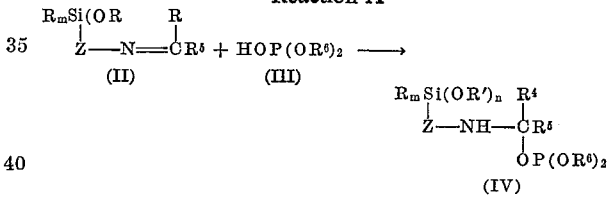

The symbols have the meanings previously given with respect to generic Formula I. The Compound IV above corresponds to the generic Formula I for the condition $a$=zero, Q=H.

In carrying out Reaction A, it is advisable to use a freshly prepared imine (II) inasmuch as yields of adduct (IV) are apt to be unsatisfactory if the imine has been allowed to stand for a prolonged period. It is also usually helpful, although not essential, to use a solvent or diluent. If a diluent is used, it should be one which is non-reactive with respect to the starting materials (II and III) and product (I). Also, for ease of removal of the diluent by distillation, the diluent should be relatively volatile. Hydrocarbon solvents such as benzene, toluene and xylene are suitable diluents. As to temperature, the reaction usually occurs well at around room temperature or somewhat lower, that is, in the range of 5 to 30° C. Somewhat lower or higher temperatures may be used, as between 0 and 50° C., depending on the solvent, the extent of dilution, and manner of addition. Longer periods are necessary for reaction when lower temperatures are used.

One reason for operating at moderate rather than higher temperatures is to minimize side reactions on the part of the imine, such as addition reactions involving two or more imine molecules. Unwanted reactions are suppressed by keeping the imine diluted. Another reason for using moderate or lower temperatures for carrying out Reaction A is to prevent subsequent reactions on the part of the product when it is formed. Although silicon-containing amino-phosphonates are stable enough to permit their isolation and use, there is an upper temperature limit to the stability of each of them. Accordingly, excessive temperature should be avoided during the preparation of silicon-containing amino-phosphonates (I). An undesired reaction that can be controlled by avoiding too high a temperature is the reverse reaction in which the product (I) decomposes into imine (II) and dialkyl phosphite (III).

In effecting Reaction A, substantially equimolar quantities of a suitable imine (II) and dialkyl phosphite (III) may be used. A slight excess, e.g. 5 to 20% of one reactant, such as the dialkyl phosphite, generally is of advantage.

In one manner of addition, dialkyl phosphite (III), either undiluted or in up to approximately 10 times its weight of non-reactive solvent, is introduced slowly into a stirred solution of the freshly prepared imine (II) in up to approximately 10 times its weight of solvent. The length of time required for the addition of phosphite depends in part on the scale of the operation. The reaction may be mildly exothermic, hence it is advisable to regulate the rate of addition so as to keep the reaction temperature below about 30° C. in order to prevent undesirable side reactions on the part of the imine. After all of the phosphite has been added, stirring is continued for a period, such as a few hours. The reaction mixture is next kept between 20 and 30° C. for a period of approximately 1 to 5 days, generally 2 days, before being processed by distilling off the solvent. Distillation and recovery of solvent can be carried out advantageously at reduced pressure, but removal of solvent also may be accomplished at atmospheric pressure if a low-boiling solvent has been used.

The product remaining after solvent has been distilled off is a diester (IV) of a silicon-containing amino-phosphonic acid. Its purity can be ascertained by any of several means, such as by titration with a standard solution of strong acid, by elemental analysis, and by absorption bands in the infrared spectrum. Strong bands typical of the phosphonate structure occur at 8.8±0.6 and 10±0.4 microns. On the other hand, absence of a band at 6 microns (characteristic of N=C) substantiates the absence of imine, showing that addition of phosphite diester occurred as intended at the carbon-to-nitrogen double bond of the silicon-containing imine.

An alternative manner of effecting Reaction A is by gradual addition of the freshly prepared imine (II), either diluted or undiluted, to the phosphite diester (III), which is preferably stirred. This manner of addition is the reverse of that previously described. In this procedure, the imine may be kept unheated, or even cold, before it comes into contact with the phosphite diester. Inasmuch as in adding the imine to the phosphite diester no appreciable concentration of imine is exposed to high temperature for any considerable length of time, a warmer temperature (e.g. 30 to 60° C. or higher) may be used to advantage in cases where the adduct is sufficiently stable. Examples 1 and 2 herein illustrate Reaction A.

In the instance wherein $a$ of generic formula I is the integer one (1) and Q is hydrogen, alkyl or aryl (collectively symbolized below by Q′) the silyl-amino-phosphonates may be formed by an addition reaction involving a primary or secondary amine of the following general Formula V and a dialkyl vinyl-phosphonate (VI) in which the hydrogen atoms of the vinyl radical may be substituted as shown in Reaction B. Reaction B pertains to the situation in which the adduct (VII) is formed from one molecule of each reactant (V and VI).

Reaction B

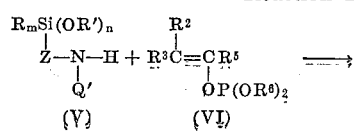

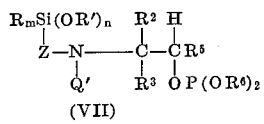

In carrying out Reaction B, a solvent which is inert with respect to the reactants and product is advantageously used, such as benzene, toluene, or xylene. The solvent helps to prevent polymerization of vinylphosphonate and facilitates control of temperature. However, product (VII) is formed also in the absence of a solvent, so use of a solvent is not critical. No appreciable quantity of heat is evolved by the desired reaction. In fact, a temperature in the range of approximately 80 to 150° C. is desirable to bring the reaction to substantial completion within a reasonable period of time, such as 10 to 50 hours. Shorter periods, such as 10 to 20 hours, apply toward the higher end of the preferred temperature range. The adduct (VII) generally is obtained in a state of good purity by stripping off the solvent at moderate temperature, as by distilling off the solvent under somewhat reduced pressure. Example 4 herein illustrates Reaction B.

The invention also embraces silyl-amino-phosphonate monomers which are diphosphonates. A diphosphonate molecule (IX) may be formed by an addition reaction involving one molecule of a silicon-containing primary amine (VIII) and two molecules of a dialkyl vinylphosphonate (VI) in which the hydrogen atoms of the vinyl radical may be substituted, as shown in Reaction C.

Reaction C

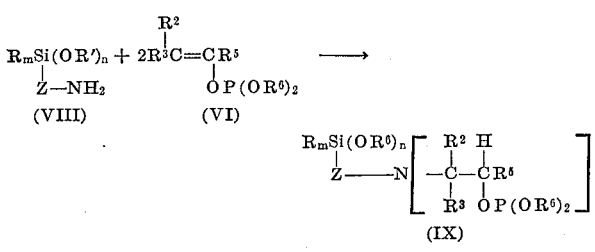

Adduct (IX) corresponds to generic Compound I when $a$ is one (1) and Q is the grouping

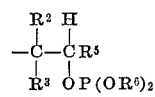

For carrying out Reaction C the comments with respect to solvent and processing of the reaction mixture which were described in connection with Reaction B are generally applicable. However, Reaction C is apt to be somewhat slower, and consequently it is advisable to employ a somewhat longer time (as 30 to 40 hours as 115° C.), or a higher temperature, or both. Example 3 herein illustrates Reaction C.

The diphosphonate compounds IX of the present invention may also be derived from iminodiethylenediphosphonic acid of the following Formula X:

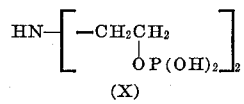

by substitution on the nitrogen atom with a silicon-containing radical, and esterified as well.

Chemical constituents for preparing monomeric silyl-amino-phosphonate compounds

Illustrative of the various dialkyl phosphites (III) (diesters of phosphorous acid) and lower alcohols which may be used as starting materials are the following, which sometimes are named with the word "hydrogen" included before "phosphite": dimethyl phosphite, diethyl phosphite, diisopropyl phosphite, dipropyl phosphite, dibutyl phosphite, di-sec-butyl phosphite, di-tert-butyl phosphite, diisobutyl phosphite, bis(1,2-dimethylpropyl) phosphite, diallyl phosphite, isopropenyl vinyl phosphite, divinyl phosphite, isopentyl 2-methylbutyl phosphite, dineopentyl phosphite, dipentyl phosphite, di-tert-pentyl phosphite, dihexyl phosphite, diisohexyl phosphite, bis(methylpentyl) phosphite, and bis(2-ethylbutyl) phosphite. Other suitable dialkyl phosphites will be readily apparent to persons skilled in the art.

The unsaturated dialkyl esters of unsubstituted or substituted vinyl phosphonic acid (VI) needed for Reactions B and C referred to above can be prepared by dehydrohalogenation of the corresponding dialkyl 2-halogenophosphonate (XI), according to Reaction D below, wherein X denotes Cl, Br or I.

Reaction D

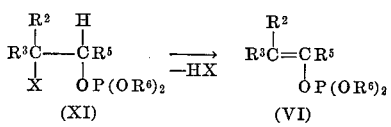

The dehydrohalogenation can be accomplished by using a reactive base such as alcoholic potassium hydroxide, following a procedure such as that reported by Kosolapoff, J. Am. Chem. Soc., 70 1971–1972 (May 1948).

The starting compounds XI for Reaction D are in turn obtainable by means of the Arbuzov reaction [1] from 1,2-dihalogeno compounds (XII) and trialkyl phosphites (XIII) as denoted in Reaction E.

Reaction E

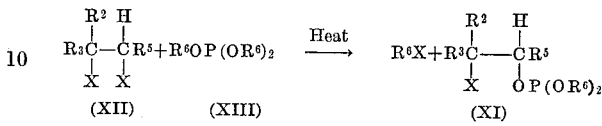

[1] References pertaining to the Arbuzov reaction appear in the "Merck Index," Seventh Edition (1960), page 1401, and in "Organic Reactions" by Kosolapoff, vol. VI, page 276 (John Wiley & Sons, Inc., New York, 1951).

Specific dialkyl 2-halogeno-phosphonate (XI) suitable for dehydrohalogenation include those shown in Table 1 below. The corresponding dehydrohalogenation products (VI) obtained by Reaction D are also shown in Table 1.

Many silicon-containing primary and secondary amines (V) are readily obtainable from commercial sources. Table 2 below lists several suitable primary amines and secondary amines.

TABLE 1

| Dialkyl 2-Halogeno-Phosphonate (XI) | | Dehydrohalogenation Products (VI) | |
|---|---|---|---|
| Name | Formula | Name | Formula |
| Diethyl 2-bromoethylphosphonate | $BrCH_2$<br>$\mid$<br>$CH_2$<br>$\mid$<br>$OP(OC_2H_5)_2$ | Diethyl Vinylphosphonate | $CH_2=CH$<br>$\mid$<br>$OP(OC_2H_5)_2$ |
| Diisopropyl 2-chloro-1-methylpropylphosphonate (From 2,3-dichlorobutane, using the Arbuzov reaction) | $ClCHCH_3$<br>$\mid$<br>$HCCH_3$<br>$\mid$<br>$OP(OCH(CH_3)_2)_2$ | Diisopropyl 1-methylpropenylphosphonate | $CH_3CH=CCH_3$<br>$\mid$<br>$OP(OCH(CH_3)_2)_2$ |
| Isopentyl 2-methylbutyl 2-chloro-1-styrylethylphosphonate (By the Arbuzov reaction, using adduct of chlorine and 1,3-butadienylbenzene) | $ClCH_2$<br>$\mid$<br>$HC-CH=CH-C_6H_5$<br>$\mid$<br>$OP-OCH_2CH(CH_3)C_2H_5$<br>$\mid$<br>$OCH_2CH_2CH(CH_3)_2$ | Isopentyl 2-methylbutyl 1-styrylvinylphosphonate | $CH_2=C-CH=CH-C_6H_5$<br>$\mid$<br>$OP-OCH_2CH(CH_3)C_2H_5$<br>$\mid$<br>$OCH_2CH_2CH(CH_3)_2$ |
| Dineopentyl 2-iodo-1-benzylethylphosphonate (By the Arbuzov reaction, using adduct of iodine and allylbenzene) | $ICH_2$<br>$\mid$<br>$HC-CH_2-C_6H_5$<br>$\mid$<br>$OP(OCH_2C(CH_3)_3)_2$ | Dineopentyl 1-benzylvinylphosphonate | $CH_2=C-CH_2-C_6H_5$<br>$\mid$<br>$OP(OCH_2C(CH_3)_3)_2$ |
| Di-tert-butyl 2-bromo-1-phenylpropylphosphonate (By the Arbuzov reaction, using adduct of bromine and propenylbenzene) | $BrCHCH_3$<br>$\mid$<br>$HC-C_6H_5$<br>$\mid$<br>$OP(OC(CH_3)_3)_2$ | Di-tert-butyl 1-phenylpropenylphosphonate | $CH_3CH=C-C_6H_5$<br>$\mid$<br>$OP(OC(CH_3)_3)_2$ |

TABLE 2.—SUITABLE AMINES CONTAINING SILICON (V)

| | m | n | R | R' | Q' | Z |
|---|---|---|---|---|---|---|
| PRIMARY AMINES | | | | | | |
| $(C_2H_5O)_3SiCH_2CH_2CH_2NH_2$ | 0 | 3 | None | $-C_2H_5$ | H | $-(CH_2)_3-$ |
| $(CH_3O)_2SiCH_2CHCH_2NH_2$<br>$\quad\quad\quad\; \mid\quad\;\mid$<br>$\quad\quad\quad CH_3\;\; CH_3$ | 1 | 3 | $-CH_3$ | $-CH_3$ | H | $-CH_2CHCH_2-$<br>$\quad\quad\;\mid$<br>$\quad\quad CH_3$ |
| $(C_6H_5)_2Si(CH_2)_3OCH_2CH_2NH_2$<br>$\quad\mid$<br>$OC_6H_5$ | 2 | 1 | $-C_6H_5$ | $-C_6H_5$ | H | $-(CH_2)_3O(CH_2)_2-$ |
| $(CH_3O)_3SiCH_2CH_2CH_2NHCH_2CH_2NH_2$ | 0 | 3 | None | $-CH_3$ | H | $-(CH_2)_3NH(CH_2)_2$ |
| $(CH_3O)_2SiCH_2CHCH_2NCH_2CH_2NH_2$<br>$\quad\quad\;\;\mid\quad\;\;\mid\quad\;\;\mid$<br>$\quad\quad\; CH_3\; CH_3\; C_2H_5$ | 1 | 2 | $-CH_3$ | $-CH_3$ | H | $\quad\quad\quad CH_3\quad C_2H_5$<br>$\quad\quad\quad\mid\quad\quad\mid$<br>$-CH_2CHCH_2N$<br>$\quad\quad\quad\quad\;\mid$<br>$\quad\quad\quad\;-CH_2CH_2$ |
| SECONDARY AMINES | | | | | | |
| $(CH_3O)_3SiCH_2CH_2CH_2NHC_6H_5$ | 0 | 3 | None | $-CH_3$ | $-C_6H_5$ | $-(CH_2)_3-$ |
| $(C_2H_5OCH_2CH_2O)_2SiCH_2CH_2CH_2NHCH(CH_3)_2$<br>$\quad\quad\quad\quad\quad\;\;\mid$<br>$\quad\quad\quad\; CH_2CH_2OC_2H_5$ | 1 | 2 | $-CH_2CH_2$<br>$\quad\quad\mid$<br>$\quad\;\; O$<br>$\quad\quad\mid$<br>$CH_3CH_2$ | $-CH_2CH_2$<br>$\quad\quad\mid$<br>$\quad\;\; O$<br>$\quad\quad\mid$<br>$CH_3CH_2$ | $CH_3$<br>$\mid$<br>$-CH$<br>$\mid$<br>$CH_3$ | $-(CH_2)_3-$ |

Silicon-containing imines conforming to Formula II in Reaction A above are part of the present invention and are derived from starting compounds having both silicon and primary amine by condensation with aldehydes or ketones. The generalized condensation reaction is depicted by Reaction F.

Reaction F

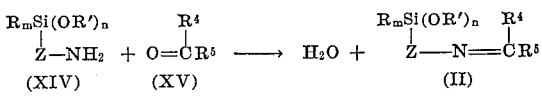

The preferred range of temperature is between 10 and 40° C. using an inert solvent such as benzene, toluene or xylene. Generally, a period of 10 to 30 hours is required for the reaction to go to completion.

In order to help Reaction F to go to completion, it is desirable to remove water as it is formed, as by having a dehydrating agent in the reaction mixture. Anhydrous magnesium sulfate, anhydrous calcium sulfate, and anhydrous sodium sulfate are three such agents. Removal of water is desirable to help stabilize the imine (II), as well as to assist in its formation. Moreover, the drier the imine, the less prone it is to polymerize. Often it is advisable to distill imines at low pressure in order to purify and stabilize them, but undistilled imine is operable, nevertheless.

Examples of individual starting compounds conforming to Formula XIV in Reaction F are those silicon-containing primary amines (Q'=H) listed in Table 2. Examples of carbonyl compounds within the scope of Formula XV of Reaction F are shown in Table 3.

TABLE 3

| | $R^5$ | $R^4$ |
|---|---|---|
| ALDEHYDES | | |
| ormaldehyde | H | H |
| Formaldehyde | H | H |
| Acetaldehyde | —CH₃ | H |
| Propionaldehyde | —C₂H₅ | H |
| Isobutyraldehyde | —CH(CH₃)₂ | H |
| Pivalaldehyde | —C(CH₃)₃ | H |
| Nonanal | —CH₂(CH₂)₆CH₃ | H |
| Acrolein | —CH=CH₂ | H |
| Methacrylaldehyde | —C(CH₃)=CH₂ | H |
| Crotonaldehyde | —CH=CHCH₃ (trans) | H |
| Tiglaldehyde | —C(CH₃)=CHCH₃ | H |
| Phenylacetaldehyde | —CH₂C₆H₅ | H |
| Benzaldehyde | —C₆H₅ | H |
| p-Tolualdehyde | —C₆H₄CH₃(1,4) | H |
| 1-naphthaldehyde | —C₁₀H₇ | H |
| KETONES | | |
| Acetone | —CH₃ | —CH₃ |
| 2-pentanone | —CH₂CH₂CH₃ | —CH₃ |
| 3-pentanone | —C₂H₅ | —C₂H₅ |
| 4-methyl-3-penten-2-one | —CH=C(CH₃)₂ | —CH₃ |
| 4-methyl-4-penten-2-one | —CH₂C=CH₂<br>　　　　　｜<br>　　　　　CH₃ | —CH₃ |
| Benzyl isopropyl ketone | —CH₂C₆H₅ | —CH(CH₃)₂ |
| Tert-butyl phenethyl ketone | —CH₂CH₂C₆H₅ | —C(CH₃)₃ |
| Acetophenone | —C₆H₅ | —CH₃ |
| 2'-butyronaphthone | —C₁₀H₇ | —CH₂CH₂C₂H₅ |

When the compound XV is an aldehyde, the condensation product is an aldimine. Table 4 gives the names of a series of aldimines (II) corresponding to each of the 14 aldehydes, respectively of Table 3. In Table 4 the ellipsis (. . .) preceding each of the 14 suffixes indicates the omission of the first part of the name, such as "N-[3-(Triethoxysilyl)propyl]." Obviously many other such suffixes can be used in accordance within the invention.

TABLE 4

| | |
|---|---|
| . . . methylenimine | . . . -2-methylallylidenimine |
| . . . ethylidenimine | . . . -2-butenylidenimine |
| . . . propylidenimine | . . . -2-methyl-2-butenylidenimine |
| . . . isobutylidenimine | . . . -2-phenylethylidenimine |
| . . . neopentylidenimine | . . . benzylidenimine |
| . . . nonylidenimine | . . . -p-methylbenzylidenimine |
| . . . allylidenimine | . . . -1-naphthylmethylenimine |

When neither $R^4$ or $R^5$ is hydrogen, then compound II is a ketimine. A series of specific ketimines, for purposes of illustration, can be based on a structure such as the following in which $R^4$ and $R^5$ are taken from successive lines of Table 3 showing 9 representative ketones:

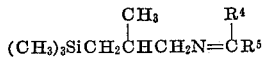

*Polymers.*—In addition to the monomers and their intermediates discussed above, this invention embraces polymeric compounds derived from them. Polymers of the present invention can be formed by reaction of two or more of the monomers at their substituted silyl groupings.

In the instance in which $n$ is one, 2 or 3 in Formula I, dimer formation is possible when the compound is exposed to hydrolyzing conditions, as illustrated by Reaction G below, wherein $n$ is one.

Reaction G

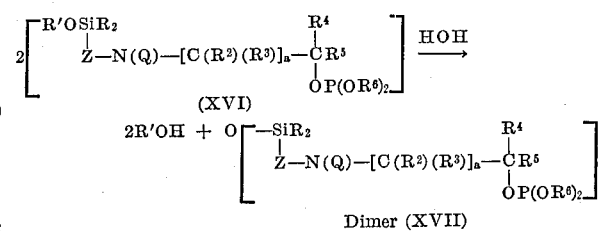

Dimer (XVII)

Hydrolysis is accelerated by using hot water or by using catalytic concentrations of acid or base.

When $n$ is 2 or 3 in Formula I, higher polymers can result because of the multiplicity of hydrolyzable bonds. This is denoted by Reaction H, wherein $n$ is 2, Z' represents the remainder of the amino-phosphonate molecule, and $p$ represents the number of repeating polymer units, i.e. the degree of polymerization.

Reaction H

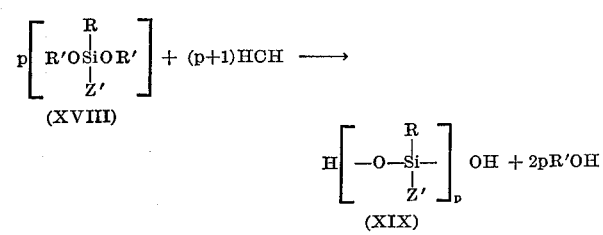

When the Z' portions of two or more amino-phosphonates are different, copolymers result when the mixture is exposed to hydrolyzing conditions. Such a product is depicted in Formula XX in Reaction I, in which Z' and Z'' represent dissimilar remainders on molecules of Formula I.

Reaction I

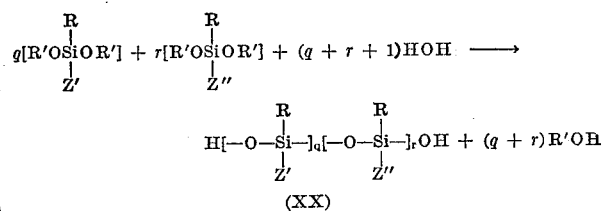

Numbers of repeating units of each type are denoted by $q$ and $r$ in the copolymer XX.

The above homopolymer XIX and copolymer XX are both linear polymers as depicted. However, when 3 hydrolyzable radicals are attached to the silicon atom ($n=3$), complex 3-dimensional polymers are formed under hydrolyzing conditions. They include both homopolymers and copolymers, and may be visualized by replacing R in Reactions H and I by OR'. Additional water brings about hydrolysis at that site, resulting in self-cross-linked polymers.

More complex copolymers (whether linear or 3-dimensional) may be formed from more than 2 species of monomer. For instance, a third comonomer results in a terpolymer.

There is little or no tendency for silicon-to-carbon bonds to undergo hydrolysis under conditions bringing about the hydrolysis of silicon-to-oxygen bonds. In other words, R radicals (as defined in connection with the generic Formula I), will not readily react under conditions normally resulting in the hydrolysis of alkoxy, aralkoxy and aryloxy radicals.

*Use of monomer and polymer compounds.*—The novel compounds of the present invention, both monomeric and polymeric, are useful as finishes for glass, especially fibrous glass, and as bonding (or coupling) agents for improving strength and lasting qualities of selected resin composites reinforced by glass fibers. Several types of thermosetting resins are applicable for making such composites, namely polyester (particularly the unsaturated alkyd-styrene type), and epoxy resins.

In one composite type, namely the laminate type, superimposed layers of glass fabric previously finished with silicon-containing amino-phosphonates of the invention and impregnated with a liquid blend of thermosetting resin and hardener or catalyst, are subjected to the application of heat and suitable pressure to form a dense, tough solid sheet. In addition to laminated sheets, other standard forms are slabs, rods, tubes and strips from which numerous commercial parts are obtained by sawing, punching, milling and machining. Thermoset resin compositions reinforced by glass fibers (woven as well as non-woven) of superior quality are useful in the production of vehicle bodies, boat hulls, naval structures, frames, load-bearing structural parts, storage tanks, non-metallic pipe, ducts, and boards for printed electrical circuits, and numerous other articles having tortuous shapes requiring high strength and resistance to impact.

The use of the compounds of the invention, as well as the processes for making them are illustrated in the examples below.

EXAMPLE 1

Preparation of diethyl 1-[3-(triethoxysilyl)propyl-amino]propylphosphonate

First, N-[3 - (triethoxysilyl)propyl]propylidenimine was prepared as follows: 221 grams (1.0 mole) of 3-(triethoxysilyl)propylamine, 120 grams (1.0 mole) of anhydrous magnesium sulfate (dehydrating agent) and 800 ml. of benzene (inert solvent) were placed in a 3-liter flask. A solution of 58 grams (1.0 mole) of propionaldehyde in 500 ml. of benzene was added dropwise to the flask at room temperature over a 3.5 hour period, during which the reaction temperature rose from 25 to 31° C. After the reaction mixture had remained at room temperature for approximately 16 hours, it was filtered. Solvent was stripped off at moderate temperature under reduced pressure. The condensation product was distilled at a pressure of approximately 0.1 mm. of mercury and a temperature of around 70° C. or slightly higher.

The distillate, N-[3 - (triethoxysilyl)propyl]propylidenimine, weighed 186.5 grams and the undistilled residue (discarded) weighed 27 grams.

Then the following main reaction was carried out (cf. Reaction A):

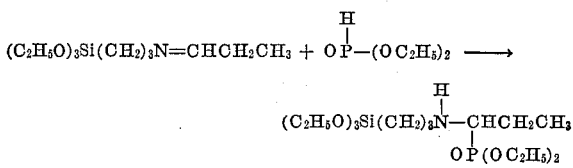

Diethyl phosphite (43.7 grams, 0.317 mole) was added to 75 grams (0.287 mole) of N-[3-(triethoxysilyl)propyl]propylidenimine in 1000 ml. of benzene without cooling. No color developed and no perceptible amount of heat was evolved. The reaction was permitted to proceed for 2 days at room temperature. Then solvent was stripped off to 95° C. at somewhat reduced pressure, leaving a liquid weighing 115 grams. Based on titration using hydrobromic acid in acetic acid, the purity of the product was 91.5%. The adduct was distilled at an absolute pressure of 0.10 to 0.15 mm. of mercury and between about 130 and 145° C. The distilled product, diethyl 1 - [3 - (triethoxysilyl)propylamino]propylphosphonate, was 98% pure, based on titration using hydrobromic acid in acetic acid.

EXAMPLE 2

Preparation of diethyl 1-[3-(triethoxysilyl)propyl-amino]2-butenylphosphonate

First, N-[3 - (triethoxysilyl)propyl]-2-butenylidenimine was prepared as follows: 221 grams (1.0 mole) of freshly distilled 3-(triethoxysilyl)propylamine was added gradually to a chilled mixture of 77 grams (1.1 mole) of crotonaldehyde, 144 grams (1.2 moles) of anhydrous magnesium sulfate, and 1300 ml. of benzene. Stirring was continued for several hours, after which the reaction mixture was filtered. Additional anhydrous magnesium sulfate was added to the filtrate, and solvent was stripped off at moderate temperature and slightly reduced pressure. The condensation product was distilled at 100° to 105° C. (0.15 to 0.40 mm. of mercury) over fresh magnesium sulfate. The yield of imine was 173 grams (63.3%), $n^{27}D$ 1.4457, and had an apparent purity of 99%.

Next, the following addition reaction was carried out:

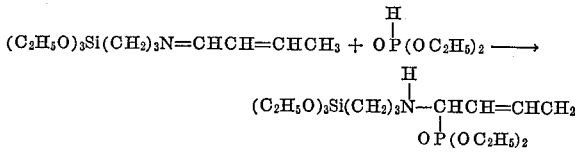

Diethyl phosphite (44.2 grams, 0.32 mole) was added to 81.8 grams (0.30 mole) of N-[3-(triethoxysilyl)propyl]-2-butenylidenimine in 1000 ml. of benzene without cooling. No color developed and no perceptible amount of heat was evolved. The reaction was allowed to proceed for 2 days at room temperature. Then solvent was stripped off until about 123 grams of liquid adduct remained in the flask. Based on titration using hydrobromic acid in acetic acid, the purity at that stage was 92%. The adduct was distilled at an absolute pressure of 0.2 to 0.4 mm. of mercury mainly between 145 and 158° C. The distilled product, diethyl 1-[3-(triethoxysilyl)propylamine]-2-butenylphosphonate was apparently 91% pure, based on titration using hydrobromic acid in acetic acid.

EXAMPLE 3

Preparatio nof tetraethyl N-[3-(triethoxysilyl)propyl] iminodiethylenediphosphonate Diethyl vinylphosphonate was prepared beforehand by dehydrohalogenation of diethyl 2-bromoethylphosphonate in accordance with the procedure used by Kosolapoff, J. Am. Chem. Soc., 70, 1971-1972 (May 1948). The same reference was followed for making the diethyl 2-bromoethylphosphonate by an Arbuzov reaction between 1,2-dibromoethane and triethyl phosphite (in which reaction bromoethane is the by-product).

Then the main addition reaction was carried out in accordance with the following equation, in which 3 molecules make up the adduct (cf. Reaction C).

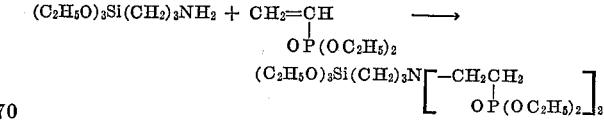

Diethyl vinylphosphonate (65.5 grams, 0.40 mole) in 100 ml. of benzene was added at room temperature to 44.2 grams (0.20 mole) of 3-(triethoxysilyl)propylamine in 200 ml. of benzene. No increase in temperature was noted. The solution was refluxed approximately 20 hours.

Then benzene was stripped off at moderate temperature and slightly reduced pressure, and toluene (300 ml.) was added to increase the reaction temperature to approximately 115° C. Reaction was continued at that temperature for approximately 32 hours. Next, solvent was stripped off at 30 to 40° C. under reduced pressure until the remaining liquid weight was 101 grams. The product, tetraethyl N-[3-(triethoxysilyl)propyl]iminodiethylenediphosphonate, was apparently 99.2% pure, based on titration using hydrobromic acid in acetic acid.

EXAMPLE 4

Preparation of diethyl 2{N-[3-(trimethoxysilyl)propyl]anilino}ethylphosphonate

The following addition reaction applied (cf. Reaction B).

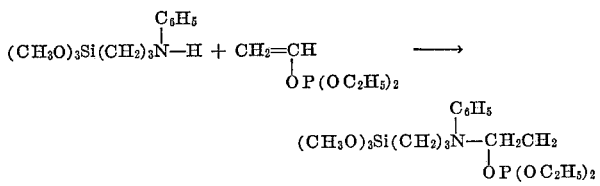

Diethyl vinylphosphonate (41 grams, 0.25 mole) in 100 ml. of benzene was added at room temperature to 63.8 grams (0.25 mole) of N-[3-(trimethoxysilyl)propyl]aniline in 200 ml. of benzene. No increase in temperature was noted. The solution was refluxed approximately 26 hours. Then benzene was stripped off at moderate temperature and slightly reduced pressure, and toluene (300 ml.) was added to increase the reaction temperature to approximately 115° C. Reaction was continued for approximately 15 hours longer. Next, solvent was stripped off at 30 to 40° C. under reduced pressure until the remaining liquid had reached a steady weight, close to the theoretical yield of 104.9 grams. The product, diethyl 2 - {N - [3 - (trimethoxysilyl)propyl]anilino}ethylphosphonate, was approximately 96% pure, based on titration using hydrobromic acid in acetic acid.

EXAMPLE 5

Preparation of glass fabric finished with diethyl 1-[3-(triethoxysilyl)propylamino]propylphosphonate and the use thereof in the preparation of a laminate with epoxy resin A glass fabric of a grade commonly employed as a filter fabric, having a weight of 9 ounces per square yard and a thread count of 56 x 54 (warp x filling) was heat-cleaned at approximately 340 to 370° C. for 72 hours, then washed by a 0.1% aqueous solution of acetic acid, and finally rinsed by water. The adduct prepared in Example 1, namely diethyl 1-[3-(triethoxysilyl)propylamino]propylphosphonate, was made into a 1% dispersion in water adjusted to a pH 3.5±0.5 by acetic acid and was then applied as a finish to the glass fabric by a padding operation. The cloth, saturated with the dispersion, was squeezed as it passed between two pad rolls. The finish was cured on the fabric by 1 minute exposure to 135° C., approximately. The amount of silyl-amino-phosphonate on the glass fabric was of the order of 0.5% of the weight of the fabric, and it imparted a soft hand to the fabric.

An epoxy resin, Epon 828, was selected for making a resin-glass laminate. Epon 828 is a thermosetting liquid sold by Shell Chemical Company, Plastics and Resin Division, for making commercial laminates, and is reported to be predominately 2,2-bis[p-(2,3-epoxypropyl)phenyl]propane (molecular weight 340); but with some closely related, higher-molecular-weight compounds also derived from glycidyl ethers of p,p'-isopropylidenediphenol present, thus bringing the average molecular weight to approximately 380. Specifications call for one gram equivalent of epoxide per 185–192 grams of resin and a viscosity of 100–160 poises at 25° C.

The hardener for the epoxy resin was m-phenylenediamine (referred to hereinafter as "CL"). In order to prepare a blend of Epon 828 and CL in the customary ratio of 100:14.5 parts by weight, the following mixing procedure was used. To 14.5 parts of Epon 828 heated to 65° C. was added an equal weight of molten curing agent CL (also at 65° C.) and that hot mixture was blended thoroughly with 85.5 parts of additional Epon 828 at room temperature. The glass fabric was impregnated with the freshly prepared Epon 828/CL blend by the common wet lay-up procedure wherein the plies of fabric are laid upon each other and wetted with the liquid resin.

To this end glass fabric having the silicon-containing amino-phosphonate cured on it was cut into 12.5 by 16 inch rectangles. These pieces were stacked, 6 at a time, with warp yarns parallel, on a bag that would subsequently seal in molten components during the pressing operation soon to follow. The bag was made of polyester film composed of polyethylene esters of terephthalic acid.

The lay-up was assembled on a plate heated to about 50° C. to reduce the viscosity of the resin and to facilitate impregnation of the plies of fabric. A pool of freshly prepared resin-hardener blend surrounded the stacked plies of glass fabric. The remaining plies were added to the stack (12 in all) and more resin-hardener blend was applied until all stacked plies were saturated. Just prior to sealing the bag holding the full stack of saturated plies, excess fluids (including entrapped air) were squeezed out by applying a rolling pin.

The bubble-free glass-resin system was closed in the bag, which was then placed in a hot laminating press with 0.12 inch thick shims to maintain that thickness. The press, initially at 93° C., was held at that temperature for 30 minutes, then kept at 120° C. for 35 minutes, and finally heated to 150° C. for 35 minutes to cure the thermosetting resin. Immediately thereafter cool water was circulated through tubes in the top and bottom platens to cool them and the laminate in order to prevent hot-warping.

Specimens of the laminates suitable for use on an Instron strength testing machine were made by sawing them into 0.5 by 4 inch rectangles and machining them to dimensions necessary to subject them to the following tests:

Compressive strength.—ASTM Test Method D695–61T
Flexural strength.—ASTM Test Method D790–59T
Tensile strength.—ASTM Test Method D638—61T Five specimens were tested directly as a set without having been exposed to the destructive action of water. Five others were immersed in boiling water for 2 hours, and five more kept in boiling water for 72 hours. (Immersion in boiling water is used as an accelerated method for assessing the permanance of laminates as measured by strength properties. Immersion in boiling water for 72 hours is considered to be roughly equivalent to immersion in water at 20° C. for around 3 years with respect to its weakening effect on strength values of a laminate. The 2 hour boil is believed to approximate the effects of a month in water at 20° C.)

All specimens were wiped dry before strength properties were measured. The data obtained are given in Table 5 under the column labelled "Example 5."

EXAMPLE 6

Preparation of an epoxy-type glass-reinforced laminate using diethyl 1 - [3 - (triethoxysilyl)propylamino] - 2 - butenylphosphonate as a bonding agent The wet lay-up procedure of Example 5 was followed except that the silicon-containing amino-phosphonate used was the adduct from Example 2, namely diethyl 1-[3-(triethoxysilyl)propylamino] - 2-butenylphosphonate. Values of concentrations, ratios, dimensions, heating conditions and testing methods were identical with those of Example 5, as were ingredients, except for the specific composition of the bonding agent.

The results are given in column Example 6 of Table 5.

EXAMPLE 7

Preparation of control laminates of glass cloth and epoxy resin using a standard commercial coupling agent as reference material The wet lay-up procedure of Example 5 was followed except that a standard commercial coupling agent recommended especially for epoxy-glass systems, namely 3-(2,3-epoxypropyloxy)propyl - trimethoxy - silane (commonly identified as Z-6040), was used in place of the amino-phosphonate. Other ingredients, as well as values of concentrations, ratios, dimensions, heating conditions, and testing methods were identical with those of Example 5. The data obtained are tabulated in Table 5 under Example 7A. A second laminate was identically prepared except that 13 plies of glass cloth were used. The data obtained for this laminate are reported in column Example 7B of Table 5.

TABLE 5

|  | Example 5 | Example 6 | Example 7A | Example 7B |
|---|---|---|---|---|
|  | Coupling Agent [1] | | | |
|  | Silyl-amino-phosphonate | | Z-6040 | |
| Plies of cloth | 12 | 12 | 12 | 13 |
| Content of Epon 828/CL, percent | 37.0 | 39.5 | 35.1 | 34.4 |
| Flexural strength, p.s.i.: | | | | |
| Unexposed to water | 98,100 | 100,200 | [2] 83,100 | 95,400 |
| After 2 hour boil | 93,500 | 94,700 | [2] 80,100 | 87,000 |
| After 72 hour boil | 75,700 | 77,500 | [2] 67,100 | 76,100 |
| Compressive strength, p.s.i.: | | | | |
| Unexposed to water | 73,800 | 67,900 | Untested | 66,700 |
| After 2 hour boil | 68,800 | 64,100 | Untested | 55,200 |
| After 72 hour boil | 61,400 | 52,800 | Untested | Untested |
| Tensile strength, p.s.i.: | | | | |
| Unexposed to water | 64,000 | 64,100 | Untested | 61,400 |
| After 2 hour boil | 62,500 | 61,100 | Untested | 55,700 |
| After 72 hour boil | 48,100 | 44,700 | Untested | Untested |

[1] Coupling agent legend:
Example 5: Diethyl 1-[3-(triethoxysilyl)propylamino]propylphosphonate.
Example 6: Diethyl 1-[3-(triethoxysilyl)propylamino]-2-butenylphosphonate.
Examples 7A and 7B: 3-(2,3-epoxypropyloxy)propyl-trimethoxysilane (Z-6040).
[2] Average of 3 trials.

The data in Table 5 show that in all tests the specimens of the laminate made with fibrous glass finished with the silicon-containing amino-phosphonate of the invention were of good quality, and, in fact, were significantly superior to those made with the widely used commercial coupling agent, 2 - (2,3 - epoxypropyloxy)propyl-trimethoxysilane (Z-6040). Even with the reinforcing action of 13 plies of glass cloth, other conditions being similar, the Z-6040 coupling agent did not provide a specimen as strong as those achieved by using the silicon-containing amino-phosphonate.

The silicon-containing amino-phosphonates of the invention, when used as a coupling agent in the epoxy-glass resin system, have strength characteristics that are in some respects improvements upon the results achieved by using the universal finish which is the subject of my earlier copending application Ser. No. 560,101.

EXAMPLE 8

Preparation of a polyester-type glass-reinforced laminate using diethyl 1 - [3 - (triethoxysilyl)propylamino] - 2-butenylphosphonate as a bonding agent Except for organic ingredients, the wet lay-up procedure of Example 5 was followed in preparing the laminate. The bonding agent used to finish the heat-cleaned glass fabric had the same composition as the silyl-amino-phosphonate used in Example 6, namely the product of Example 2, diethyl 1-[3-(triethoxysilyl)propylamino]-2-butenylphosphonate. However, the resin-catalyst system was of the polyester-peroxide type, i.e. a 100:1 blend of polyester resin and benzoyl peroxide (abbreviated BPO) was used. The polyester resin used was Paraplex P-43 (a trademark of Rohm & Haas Company), a formulated thermosetting liquid having a viscosity of approximately 25 poises at 25° C., 70% of it being the polyester made from maleic anhydride, phthalic anhydride, and 1,2-propanediol (using mole proportions of 1.0, 1.0 and 2.2, respectively), and the remaining 30% being styrene monomer functioning initially as a diluent. Paraplex P-43 is a standard commercial resin for use in laminates reinforced by fibrous glass.

Otherwise, the values of concentrations, dimensions, heating conditions, and testing methods were identical with those of Example 5. The test results are given in Table 6 under the column Example 8.

EXAMPLE 9

Preparation of a control laminate of glass cloth and polyester resin using a standard commercial coupling agent as reference material The procedure of Example 8 was repeated except that a standard commercial coupling agent recommended especially for polyester-glass laminates was used in place of the amino-phosphonate, i.e. Dow Corning Z-6030 Silane, understood to be methacryloyloxypropyl-trimethoxy-silane. The data obtained are given in column Example 9 of Table 6 below.

TABLE 6

|  | Example 8 | Example 9 |
|---|---|---|
|  | Coupling Agent | |
|  | Silyl-amino-phosphonate [1] | Standard Reference (Z-6030) [2] |
| Plies of glass cloth | 12 | 12 |
| Thickness of laminate, in | 0.119 | 0.120 |
| Content of Paraplex P-43/BPC | 36.9% | 36.9% |
| Flexural strength, p.s.i.: | | |
| Unexposed to water | 78,500 | 88,600 |
| 2 hour boil | 58,700 | 82,400 |
| Compressive strength, p.s.i.: | | |
| Unexposed to water | 55,600 | 63,500 |
| 2 hour boil | 36,200 | 45,100 |
| Tensile strength, p.s.i.: | | |
| Unexposed to water | 60,000 | 54,000 |
| 2 hour boil | 55,300 | 53,000 |

[1] 1-[3-(triethoxysilyl)propylamine]-2-butenylphosphonate.
[2] Methacryloyloxypropyl-triethoxy-silane.

The test data of Table 6 show that the amino-epoxy-phosphonates of the present invention can be used to make satisfactory laminates of fibrous glass and polyester resins. Although flexural and compressive strengths of the silyl-amino-phosphonate are lower than those obtained by the reference material, they are satisfactory, and the tensile strengths obtained are superior to those of the reference material.

EXAMPLE 10

Preparation of an epoxy-type laminate reinforced by glass fabric using N-[3-(triethoxysilyl)propyl]aminodiethylene-diphosphonate as bonding agent The wet lay-up procedure of Example 5 was followed except that the silicon-containing amino-phosphonate used was the product from Example 3. Values of concentrations, ratios, heating conditions, dimensions and testing methods were identical with those of Example 5, as were ingredients, except for the specific composition of the bonding agent. The test results are given in column Example 10 of Table 7.

EXAMPLE 11

Example 10 was repeated with the variation that m-phenylenediamine was replaced by a liquid anhydride type of hardener or curing agent for the resin, namely methyl-cis-5-norbornene - 2,3 - dicarboxylic anhydride $C_{10}H_{10}O_3$, commonly called methyl-NADIC anhydride and referred to herein as NMA.

Furthermore, instead of 14.5 parts of hardener per 100 parts of epoxy resin, the ratio was 455 parts of NMA and 3 parts of benzylidmethylamine (accelerator) per 100 parts of epoxy resin (all parts by weight). Because the ingredients were liquids, no heating was required in order to blend them. The test results are given in column Example 11 of Table 7.

EXAMPLE 12

Preparation of an epoxy-type laminate reinforced by glass fabric using diethyl 2-{N-[3-(trimethoxysilyl)propyl]anilino}ethylphosphonate as bonding agent Example 10 was repeated with the variation that the silicon-containing amino-phosphonate was the product prepared in Example 4. Values of concentration, ratios, heating conditions, dimensions and testing methods were identical with those of Example 5, as were ingredients, except for the specific composition of the bonding agent. The test results are given in column Example 12 of Table 7.

EXAMPLE 13

Example 11 was repeated except that the product prepared in Example 4, namely diethyl 2-{N-[3-(trimethoxysilyl)propyl]anilino}ethylphosphonate, was used as the bonding or coupling agent. The test results are given in column Example 13 of Table 7.

TABLE 7

| | Example 10 | Example 11 | Example 12 | Example 13 |
|---|---|---|---|---|
| Coupling Agent | | | | |
| | Product of Example 3 | | Product of Example 4 | |
| Hardener or curing agent | CL | NMA | CL | NMA |
| Plies of glass cloth | 12 | 12 | 12 | 12 |
| Thickness of laminate, in | 0.120 | 0.118 | 0.120 | 0.117 |
| Content of Epon 828/Hardener, percent | 35.2 | 38.3 | 35.3 | 37.7 |
| Flexural strength, p.s.i.: | | | | |
| Unexposed to water | 95,200 | 95,000 | 92,700 | 86,500 |
| After 2 hour boil | 84,800 | 87,400 | 80,500 | 79,800 |
| After 72 hour boil | 67,400 | 73,200 | 61,800 | 76,100 |
| Compressive strength, p.s.i.: | | | | |
| Unexposed to water | 71,900 | 70,100 | 67,800 | 57,000 |
| After 2 hour boil | 66,400 | 58,800 | 62,500 | 51,000 |
| After 72 hour boil | 61,100 | 49,700 | 62,200 | 46,100 |
| Tensile strength, p.s.i.: | | | | |
| Unexposed to water | 66,200 | 58,400 | 57,300 | 59,000 |
| After 2 hour boil | 57,000 | 51,400 | 51,800 | 50,800 |
| After 72 hour boil | 46,300 | 52,200 | 36,700 | 51,500 |

The strength characteristics of the laminates prepared in Examples 10, 11, 12 and 13, as well as those of Examples 5 and 6, show the particular suitability of the silyl-amino-phosphonates of the present invention as bonding or coupling agents in epoxy-glass systems, or as finishes for fibrous glass to be used to reinforce thermosetting resins.

What I claim is:

1. The compound having the formula

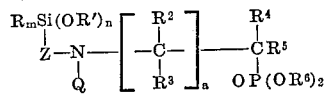

wherein:
 $a$ has the value of zero or one;
 $m$ has the value of zero, one, 2 or 3;
 $n$ equals the quantity $(3-m)$;
 R and R' are selected independently from the group consisting of alkyl, alkoxyalkyl, aralkyl and aryl;
 $R^2$, $R^3$ and $R^4$ are selected independently from the group consisting of H and alkyl;
 $R^5$ is selected from the group consisting of H, alkenyl, alkyl, aralkyl and aryl;
 $R^6$ is selected from the group consisting of lower alkyl and lower alkenyl;
 Q is selected from the group consisting of H, alkyl, aryl and the group

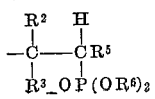

and
 Z is a divalent organic radical selected from the group consisting of one or more unsubstituted and alkyl-substituted methylene groups interrupted by one or more groups selected from the class consisting of ether oxygen, thioether sulfur, secondary amino nitrogen, and tertiary amino nitrogen.

2. The compound according to claim 1 which is diethyl 1-[3-triethoxysilyl)propylamino]propylphosphonate.

3. The compound according to claim 1 which is diethyl 1-[3 - triethoxysilyl)propylamino]-2-butenylphosphonate.

4. The compound according to claim 1 which is tetraethyl N - [3 - (triethoxysilyl)propyl]iminodiethylenediphosphonate.

5. The compound according to claim 1 which is diethyl 2-{N-[3 - (trimethoxysilyl)propyl]anilino}ethylphosphonate.

6. The compound according to claim 1 wherein $a$ is selected as zero and Q is H.

7. The compound according to claim 1 wherein $a$ is selected as one and Q is selected from the group H, alkyl and aryl.

8. The compound according to claim 1 wherein $a$ is selected as one and Q is

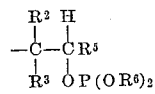

9. The process of preparing the compound of claim 1 comprising reacting a silicon-containing imine of the formula

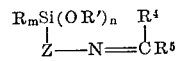

with a dialkyl phosphite having the formula $$HOP(OR^6)_2$$

at a temperature of between about 0° C. and 50° C.

10. The process according to claim 9 wherein the reaction is in the presence of a volatilizable diluent.

11. The process according to claim 9 wherein the reaction mixture contains between 5 and 20% excess, on a mole basis, of dialkyl phosphite.

12. The process according to claim 10 wherein the reaction temperature is maintained below 30° C. and the product is recovered by distillation of the volatilizable diluent.

13. The dimeric compound having the formula

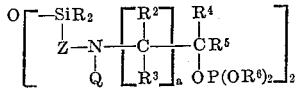

wherein
 $a$ has the value of zero or one;
 R is selected from the group consisting of alkyl, alkoxyalkyl, aralkyl and aryl;
 $R^2$, $R^3$ and $R^4$ are selected independently from the group consisting of H and alkyl;
 $R^5$ is selected from the group consisting of H, alkenyl, alkyl, aralkyl and aryl;
 $R^6$ is selected from the group consisting of lower alkyl and lower alkenyl;
 Q is selected from the group consisting of H, alkyl, aryl and the group

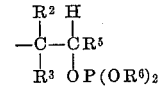

and
 Z is a divalent organic radical selected from the group consisting of unsubstituted and alkyl-substituted methylene groups, and unsubstituted and alkyl-substituted methylene groups interrupted by one or more groups selected from the class consisting of ether oxygen, thioether sulfur, secondary amino nitrogen and tertiary amino nitrogen.

14. The polymeric compound formed by subjecting the compound of claim 1 wherein $n$ is 2 or 3 to hydrolyzing conditions.

15. The copolymeric compound formed by subjecting at least two different compounds corresponding to the compound of claim 1 wherein $n$ is 2 or 3, to hydrolyzing conditions.

16. The process of preparing the compound of claim 1 comprising reacting a silicon-containing amine having the formula

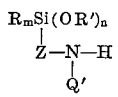

wherein Q' is selected from the group consisting of H, alkyl and aryl, with a dialkyl ester of vinylphosphonic acid having the formula

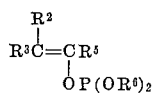

17. The process according to claim 16 wherein the reaction takes place in the presence of an inert solvent and the reaction product is thereafter separated from the inert solvent.

18. The process according to claim 16 wherein the reaction takes place at a temperature of between about 80° C. and 150° C.

19. The process according to claim 16 wherein Q' is selected as hydrogen, and the dialkyl ester of vinyl phosphonic acid reacts with the silicon-containing amine in a mole ratio of about 2 to 1, whereby the product formed is a diphosphonate.

20. The process according to claim 17 wherein the silicon-containing amine has the formula

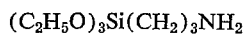

and the dialkyl ester of phosphonic acid has the formula

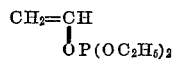

21. A fibrous glass material having a finish thereon obtained by applying to said material a silyl-amino-phosphonate as defined by claim 1, and subjecting said compound to curing conditions.

22. The finished fibrous glass material according to claim 21 wherein the silyl-amino-phosphonate is diethyl 1-[3-(triethoxysilyl)propylamino]-propylphosphonate.

23. The finished fibrous glass material according to claim 21 wherein the silyl-amino-phosphonate is diethyl 1 - [3 - triethoxysilyl)propylamino] - 2 - butenylphosphonate.

24. The finished fibrous glass material according to claim 21 wherein the silyl-amino-phosphonate is diethyl 2{N - [3 - (trimethoxysilyl)propyl]anilino}ethylphosphonate

25. The finished fibrous glass material according to claim 21 wherein the silyl-amino-phosphonate is tetraethyl N - [3 - (trimethoxysilyl)propyl]iminodiethylenediphosphonate.

26. A laminate prepared from multiple layers of fibrous glass fabric and a thermosetting resin selected from the class consisting of epoxy and polyester, said glass fabric being bonded to said resin by a coupling agent comprising a silyl-amino-phonsphonate selected from the class defined by claim 1.

27. The laminate according to claim 24 wherein the coupling agent is a silyl-amino-phosphonate as defined by claim 1 wherein $m$ is selected as zero or one.

28. The laminate according to claim 25 wherein the silyl-amino-phosphonate is diethyl 1-[3-(triethoxysilyl) propylamino]propylphosphonate.

29. The laminate according to claim 25 wherein the silyl-amino-phosphonate is 1 -[3-(triethoxysilyl)propylamino]-2-butenylphosphonate.

30. The laminate according to claim 27 wherein the silyl-amino-phosphonate is tetraethyl N-[3-(triethoxysilyl)propyl] iminodiethylenediphosphonate.

31. The laminate according to claim 27 wherein the silyl-amino-phosphonate is deithyl 2-{N-[3-(trimethoxysilyl)propyl]anilino}ethylphosphonate.

References Cited

UNITED STATES PATENTS

| | | | |
|---|---|---|---|
| 3,203,923 | 8/1965 | Fekete | 260—46.5 |
| 3,203,925 | 8/1965 | Fekete | 260—46.5 |

ROBERT F. BURNETT, Primary Examiner

W. J. VAN BALEN, Assistant Examiner

U.S. Cl. X.R.

117—76, 126; 161—193, 98, 2; 260—46.5, 448.8

UNITED STATES PATENT OFFICE
CERTIFICATE OF CORRECTION

Patent No. 3,492,193            January 27, 1970

Giuliana C. Tesoro

It is certified that error appears in the above identified patent and that said Letters Patent are hereby corrected as shown below:

Column 1, Formula I, right-hand portion should read

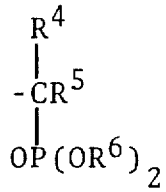

line 63, "(3m)" should read -- (3 - m) --. Column 2, lines 3 to 5, the formula should read

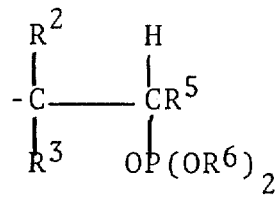

same column 2, line 35, Formula II, should appear as shown below:

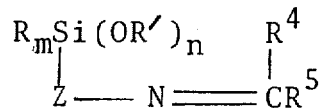

same column 2, line 40, Formula IV, the right-hand portion should read

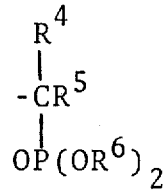

Column 3, lines 70 to 75, Formula VI, the right-hand portion should read

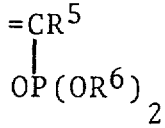

Column 4, Formula VII, the right-hand portion should read 3,492,193
(2)
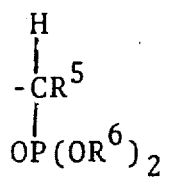
lines 31 to 35, Formula VI should read
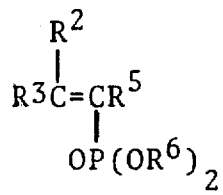
lines 36 to 40, Formula IX, should read
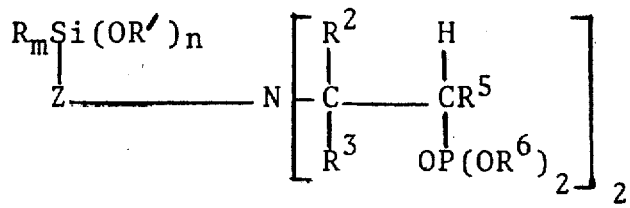
line 43, cancel "(IX)"; lines 45 to 48, the formula should read
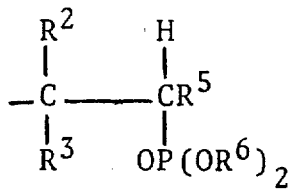
line 54, "as", second instance, should read -- at --; lines 60 to 64, the formula should read
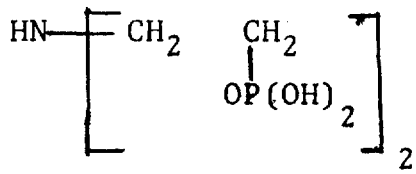
Column 5, lines 16 to 20, Formula XI, the right-hand portion should read
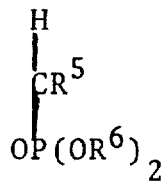

Formula VI, the right-hand portion should read

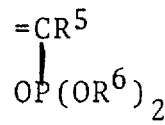

Table 1, left column, the first formula should read

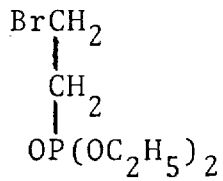

Column 6, lines 8 to 12, Formula XI, the right-hand portion should read

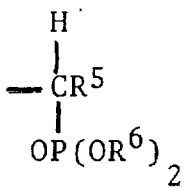

line 17, "2-halogeno-phosphonate" should read -- 2-halogeno-phosphonates --; Table 3, line following "ALDEHYDES" should be canceled. Column 8, lines 16 to 19, Formula XVI, right-hand portion should read

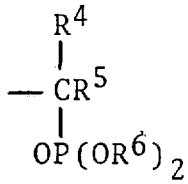

lines 21 to 24, Formula XVII, right-hand portion should read

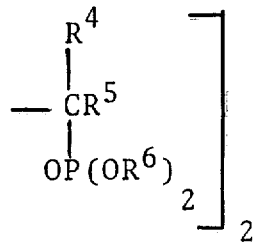

line 37, "HCH" should read -- HOH --. Column 10, line 34, the right hand portion of the formula should read

line 51, "Preparatio nof" should read -- Preparation of --; line 6 after "+" insert -- 2 --. Column 11, lines 18 to 20, the second formula should read

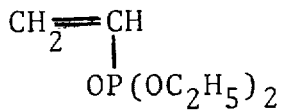

lines 21 to 24, the formula, right-hand portion should read

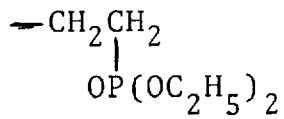

Column 13, Table 5, last line, "noil" should read -- boil --. Column 14, Table 6, line 36, "P ies" should read -- Plies --. Column 15, line 60, "3m" should read -- 3-m --. Column 16, line 3, after "more" insert -- unsubstituted and alkyl-substituted methylene groups, and --; line 9, "1-[3-triethoxysilyl)" should read -- 1-[3-(triethoxysilyl) --; line 11, "1-[3-triethoxysilyl)" should read -- 1-[3-(triethoxysilyl) --; lines 25 to 28, the formula should read

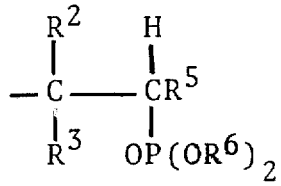

lines 50 to 53, the formula, right-hand portion, should read

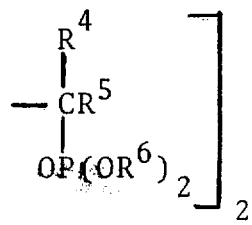

lines 66 to 69, the formula should read

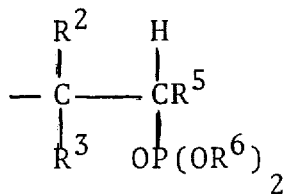

Column 17, lines 20 to 23, the formula should read

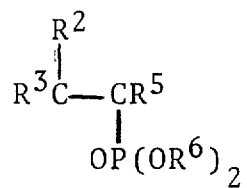

line 36, "17" should read -- 19 --; lines 42 and 43, the formula should read

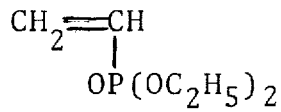

Column 18, line 6, "1-[3-triethoxysilyl)" should read -- 1-[3-(triethoxysilyl) --; line 22, "24" should read -- 26 --; line 25, "25" should read -- 27 --; line 28, "25" should read -- 27 --; line 35, "deithyl" should read -- diethyl --.

Signed and sealed this 29th day of September 1970.

(SEAL)
Attest:

EDWARD M. FLETCHER, JR.
Attesting Officer

WILLIAM E. SCHUYLER, JR.
Commissioner of Patents